United States Patent [19]

Smith

[11] Patent Number: 4,487,816

[45] Date of Patent: Dec. 11, 1984

[54] SPRAYABLE, MODIFIED POLYISOCYANURATE COMPOSITION AND ARTICLES THEREFROM

[75] Inventor: Stuart B. Smith, Conyers, Ga.

[73] Assignee: Thermocell Development, Ltd., Knoxville, Tenn.

[21] Appl. No.: 568,037

[22] Filed: Jan. 4, 1984

Related U.S. Application Data

[63] Continuation-in-part of Ser. No. 482,631, Apr. 6, 1983, Pat. No. 4,467,014, which is a continuation-in-part of Ser. No. 398,369, Jul. 14, 1982, Pat. No. 4,426,461.

[51] Int. Cl.³ ............... B32B 27/40; C08G 18/14; C08G 18/32; C08G 18/22
[52] U.S. Cl. .................. 428/423.3; 521/49; 521/52; 521/57; 521/58; 521/77; 521/175; 521/902; 528/73; 528/77; 428/422.8
[58] Field of Search .......... 521/49, 52, 57, 58, 521/175, 77, 902; 528/77, 73; 428/422.8, 423.3

[56] References Cited

U.S. PATENT DOCUMENTS

| | | | |
|---|---|---|---|
| 2,753,276 | 7/1956 | Brochhagen et al. | 117/72 |
| 4,024,310 | 5/1977 | Wooler et al. | 428/422.8 |
| 4,040,992 | 8/1977 | Bechara et al. | 521/902 |
| 4,071,505 | 1/1978 | Meckel et al. | 528/49 |
| 4,101,465 | 7/1978 | Lockwood et al. | 521/118 |
| 4,116,879 | 9/1978 | Bechara et al. | 252/426 |
| 4,136,240 | 1/1979 | Zimmerman et al. | 521/902 |
| 4,166,164 | 8/1979 | Cenker et al. | 521/129 |
| 4,169,921 | 10/1979 | Moss et al. | 521/125 |
| 4,177,335 | 12/1979 | Austin et al. | 521/171 |
| 4,186,255 | 1/1980 | Klein et al. | 521/128 |
| 4,189,541 | 2/1980 | Ohashi et al. | 521/110 |
| 4,204,019 | 5/1980 | Parker | 428/422.8 |
| 4,221,875 | 9/1980 | Yukuta et al. | 521/128 |
| 4,292,353 | 9/1981 | Ohashi et al. | 428/422.8 |
| 4,335,218 | 6/1982 | DeGuiseppi | 428/422.8 |
| 4,349,638 | 9/1982 | Naragan | 521/125 |
| 4,362,823 | 12/1982 | Wernsing | 521/116 |

Primary Examiner—Herbert S. Cockeram
Attorney, Agent, or Firm—Richard P. Crowley

[57] ABSTRACT

A sprayable, modified polyisocyanurate solid or foam composition, with fast reaction times and excellent fire properties and capable of being sprayed in a one-to-one, fixed-volume spray system, is prepared by the reaction of a low-functionality MDI, with a polyol composition comprising a methoxy polyethylene glycol and a methyl glucoside polyol, the reaction carried out in the presence of a trimerization catalyst, to provide a sprayable polyisocyanurate composition particularly useful for spraying upright and overhead surfaces, due to the fast reaction time and rapid cure.

27 Claims, No Drawings

SPRAYABLE, MODIFIED POLYISOCYANURATE COMPOSITION AND ARTICLES THEREFROM

REFERENCE TO PRIOR APPLICATIONS

This application is a continuation-in-part of U.S. patent application Ser. No. 482,631, filed Apr. 6, 1983, now U.S. Pat. No. 4,467,014 which application is a continuation-in-part of U.S. patent application Ser. No. 398,369, filed July 14, 1982, now U.S. Pat. No. 4,426,461, issued Jan. 17, 1984, both hereby incorporated by reference in their entirety.

BACKGROUND OF THE INVENTION

U.S. patent application Ser. No. 482,631, filed Apr. 6, 1983, relates to a polyisocyanurate coating composition particularly useful when sprayed in equal volumes as a solid or very high-density foam composition on a substrate, such as a rigid-foam board material, such as rigid polyisocyanurate foam board material. The polyisocyanurate coating composition is prepared by reacting a low-functionality MDI with a polyol composition which comprises a mixture of di or triethylene glycol with a methoxy polyalkylene glycol, such as methoxy polyethylene or polypropylene glycol, the reaction being carried out in the presence of a trimerization catalyst. Optionally, polyether triols may be employed in the polyol composition of the reaction, to increase the impact strength of the resulting cured coating. Some portion of the methoxy polyethylene glycol may be incorporated into the MDI, to provide equal-volume A-side and B-side mixtures, which permits the easy spraying in one-to-one, fixed-volume spray equipment.

U.S. patent application Ser. No. 398,369, filed July 14, 1982, is directed to the preparation of a unique, modified polyisocyanurate foam composition prepared by reacting a low-functionality MDI with from about 5 to 40 parts by weight of a methoxy polyalkylene glycol composition, typically a methoxy polyethylene or polypropylene glycol composition, and with the reaction carried out in the presence of a blowing agent and a trimerization catalyst, to produce a rigid-foam composition having good fire resistance. If desired, the polyol composition employed also may include polyethylene glycol for cost consideration. The polyisocyanurate composition produced is typically characterized by a high compressive strength of about 30 psi or higher, low flame-spread values of 20 or less and low smoke values of about 25 or less.

It is desirable to provide a sprayable polyisocyanurate composition for the spraying of foam and solid coatings. Typically, the foam and coating market for spraying preferentially requires a one-to-one-by-volume system of the A- and B-side components, with the A side comprising the isocyanate or an isocyanate-polyol mixture, and the B side comprising the polyol and its components, such as surfactants, catalysts, blowing agents and the like. It has been found that, when alkoxy polyethylene glycols, such as methoxy polyethylene glycol, are used to form very stiff materials, the stiff materials only can be obtained when the methoxy polyethylene glycol is used in combination with a high isocyanate index, which prevents the popularity of the system in a one-to-one, fixed-spray system. It is, therefore, desirable to provide a modified polyisocyanurate composition, particularly a composition which may be sprayed in fixed, one-to-one volume systems, and which provides for foam and solid coatings of high strength and rigidity and with acceptable fire-performance properties.

SUMMARY OF THE INVENTION

The invention relates to a modified polyisocyanurate composition, to the process of preparing the composition and to substrates coated with solid or foam coatings of the composition. In particular, the invention concerns a modified polyisocyanurate composition containing modifying amounts of a methyl glucoside in combination with an alkyoxy polyalkylene glycol, and which compositions are particularly suitable for spraying in one-to-one, fixed volume spraying systems.

It has been discovered that modified polyisocyanurate compositions of high strength and good rigidity and with good flame and fire properties may be prepared by the reaction of MDI in the presence of a trimerization catalyst with a polyol composition which comprises a combination of a methyl glucoside and an alkyoxy polyalkylene glycol. In general, the modified polyisocyanurate composition is prepared by reacting 100 parts of MDI, having an average functionality of less than about 2.4; for example, 2.0 or less, with a polyol composition which comprises a selected amount of an alkoxy polyalkylene glycol and methyl glucoside polyol. The reaction is carried out in the presence of a trimerization catalyst and, optionally, in the presence of an antifoaming or degassing additive, where a solid, sprayable coating is desired, one or more urethane-type catalysts to promote cross-linking, a buffering agent to permit adjustment of the reaction cream time of the composition and, optionally, where a foam composition is desired in the presence of a blowing amount of a blowing agent and typically a cell-control agent to promote the formation of fine foam structure.

The modified polyisocyanurate composition of the invention so prepared is particularly useful in being sprayed or poured, to produce foam or solid coatings on substrates, such as to form panels or mats for use in roofings, to prepare a washable surface, such as panels for agricultural plants, for flotation coatings on urethanes or polystyrene or polyisocyanurate foam, and as sealants for waterproof cement. More particularly, the modified polyisocyanurate composition is useful for forming a solid, high-gloss, washable coating on one or both surfaces of a rigid-foam board stock used for insulation purposes, such as, for example, a polyisocyanurate or polystyrene foam board stock. The improved, modified polyisocyanurate composition is particularly useful in the construction field, because of the good fire and flame properties of the composition and the good adhesion and high-strength rigidity of the coating composition. The modified polyisocyanurate composition is particularly useful when A and B sides are employed in fixed, one-to-one-volume spray equipment, so as to provide for a very stiff or rigid or semirigid coating or foam material. The modified polyisocyanurate composition, when sprayed in fixed-foam equipment, is particularly useful when being sprayed on vertical or upright-type surfaces or overhead surfaces, due to the fast reaction time and the formation of high-strength, rigid, good fire-performance materials on coating. Of course, if desired, where rapid reaction time is not important, the modified polyisocyanurate composition may be employed in variable spray equipment or stochiometrically reacted and admixed as desired for other purposes.

The composition of the invention is carried out employing in the reaction an MDI which should not comprise the standard or conventional crude MDI or methylene phenyl diisocyanate mixture, having a high functionality of 2.7 or greater, but rather the MDI should have a functionality of about 2.4 or less; for example, about 1.7 to 2.4, and with a minimum, for example, of 50% of a difunctional group, to provide for the desired polyisocyanurate composition. Typical MDIs suitable for use would include, but not be limited to, aromatic and dicyclic compounds, such as 4,4'-methylene bis(phenyl isocyanate), 4,4'-methylene bis (tolyl isocyanate), 4,4'-methylene bis (cyclohexyl isocyanate) and the like and similar compounds and mixtures thereof.

The invention relates to the discovery that a polyol composition, comprising an alkoxy polyalkylene glycol, in combination with a methyl glucoside, may be reacted with a low-functionality MDI, to provide fast-reacting, high-strength, rigid, cured compositions. The cured coating composition employing the combination is characterized by a high char and no melting on exposure to burning and low smoke, and typically reacts within 10 seconds, and more particularly 3 seconds or less; that is, to cream time, and is cured to a tack-free condition and generally in less than 30 seconds; for example, 10 seconds, and typically is rapidly and substantially cured in under 5 minutes, such as about 2 minutes or less. The modified polyisocyanurate composition is prepared employing an alkoxy polyalkylene glycol, such as $C_1$–$C_3$ alkoxypoly $C_2$–$C_3$ alkylene glycol, and particularly a methoxy polyalkylene glycol, and more particularly a methoxy polyethylene or methoxy polypropylene glycol. Typically, such methoxy glycols have a low hydroxyl number of from about 100 or less and represent glycols, where an alkoxy group, such as a methoxy group, is substituted for the hydroxyl group at one end of the glycol. The employment of methoxy polyethylene glycol (MPEG) often permits a reduction in the standard use of the trimerization catalyst, since the MPEG is very reactive and reduces cure time. The MPEG is employed in an amount sufficient to provide for the desired reaction time. The employment of too much MPEG in the modified polyisocyanurate composition produces a very fast reaction time and lowers the rigidity of the resulting cured composition, while the employment of an insufficient amount of the MPEG, in combination with the methyl glucoside, provides for a very slow, undesirable reaction, so that the composition is not subject to spraying, particularly on upright surfaces. Generally, the amount of MPEG employed is about 50 parts or less of MPEG per 100 parts of MDI; for example, about 25 to 50 and more particularly 40 to 60 parts.

The alkoxy polyalkylene glycols useful in the invention have the structural formula:

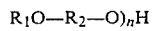

$R_1O$—$R_2$—$O)_nH$ wherein $R_1$ is a lower alkyl group, such as a methyl, ethyl or propyl group, and $R_2$ is a di or trimethylene group; for example, ethylene or propylene group, and n is a number of from about 3 to 20; for example, 4 to 10, with the preferred glycol being methoxy polyethylene glycol. The glycol typically is a liquid with an average molecular weight of less than about 600; for example, 275 to 550. The alkoxy polyalkylene glycols useful in the invention include, but are not limited to, methoxy polyethylene glycol, methoxy polypropylene glycol, ethoxy polypropylene glycol and mixtures and combinations thereof.

It has been discovered that methyl glucoside polyols can be mixed readily with MPEG and that the mixture shows excellent solubility with the blowing agent, the MDI and the catalyst. Methyl glucoside polyols, by themselves, apparently due to stearic hindrance, will not trimerize with high-functionality MDI and typically are very slow-reacting. Further, the methyl glucoside polyols, when in use, present a fire problem with the resulting composition, unless high levels of flame retardants are employed in the composition. However, it has been discovered that, in combination with alkoxy polyalkylene glycol and a trimerization catalyst, modified polyisocyanurate compositions are produced with excellent fire properties and fast reaction times, with high rigidity and strength. Thus, when employing methyl glucoside polyols in combination with MPEG, very stiff materials can be obtained, without the need for a high isocyanate index, and the materials may be employed in fixed, one-to-one spray equipment.

The presently available methyl glucosides have an average hydroxyl number of from 375 to about 530. It is preferred that the methyl glucoside, having a hydroxyl number of about 400 or less, be employed, so as to provide for a polyol composition, particularly on the B side, having a total hydroxyl number, in combination with the MPEG, of 325 or less; for example, 250 to 300. Methyl glucoside polymers having a hydroxyl number of 530 may be used in admixture with the methyl glucosides of 375 if desired; however, it has been found that the methyl glucoside polyols having a hydroxyl number of 530 are very slow-reacting and are not preferred. Further, it has been discovered that sucrose amine polyols do not perform satisfactorily as a substitute for methyl glucoside in the modified polyisocyanurate composition of the invention.

It is recognized that very minor amounts of other polyols may be employed in the polyol compositions of the invention, such as diethylene glycol and trimer polyols and sucrose amine polyols; however, high hydroxyl-number polyols present a problem, in that they tend to generate too much heat and provide higher friability compositions and, therefore, do not lend themselves to forming one-to-one-volume A- and B-side compositions for spraying in fixed-spray systems. Other polyols may be used, for example, in amounts up to 10 parts per 100 parts of the MDI, and more particularly up to 5 parts per 100 parts of MDI; however, higher polyols require a higher functionality MDI. The methyl glucoside polyols are typically employed in an amount up to about 75 parts per 100 parts of the MDI, and more typically in an amount of from 25 to 75 and generally 40 to 60 parts per 100 parts of MDI.

In preparing the modified polyisocyanurate composition, the reaction is carried out in the presence of one or more trimerization catalysts, such as a single-stage catalyst and typically a single catalyst, which provides for a rapid and very high exotherm; for example, over 210° F. in less than about 10 seconds. Suitable trimerization catalysts for use comprise, but are not limited to, fatty-acid esters of alkyl metals, such as potassium, such as, for example, $C_6$–$C_{12}$ esters like potassium octoate. The amount of trimerization catalyst may vary, depending on the reaction time and composition. Other trimerization catalysts may be used, such as quaternary ammonium trimerization catalysts and the like.

Further, it has been found that buffering agents and agents which reduce and control reaction cream time should be employed in combination in the catalyst system. One suitable buffering agent employed, to reduce the cream time to the desired reaction cream-time level, includes polyvalent metal, such as zinc, and more particularly polyvalent fatty-acid esters, such as zinc octoate and those compounds typically used as paint dryers, which permit a reduction in the cream time. The amount of the buffering or cream-time adjuster agent may vary, so as to provide for a desired reaction cream time suitable for use with the composition, but, where the composition is a sprayable composition used on upright, overhead surfaces, the reaction cream time should be quite short; for example, about 3 seconds or less.

Other cross-linking catalysts may be employed in the catalyst system, so as to promote additional cross-linking and provide for rapid gelling, and such catalysts would include the standard urethane-type catalysts, such as the alkanol amine-type catalysts, such as the triethanol diamines and diethanol amines, typically in combination with tetravalent metals, such as a tetravalent tin catalyst. The amount of the cross-linking catalyst used in combination with the trimerization catalyst may vary, depending on the degree of gelling and cross-linking desired. However, it has been found that, if the trimerization catalyst is omitted or insufficient amounts are employed, then the cured, modified polyisocyanurate composition will not have acceptable and satisfactory performance characteristics, due, apparently, to the excess amount of urethane linkages in the cured composition.

Where the sprayable, modified polyisocyanurate composition is to be sprayed or employed as a solid coating, it is desirable to provide a degassing or antifoaming agent, such as an antifoaming silicone material, in an amount sufficient to prevent the bubbles or gases from forming in the solid coating during the spraying operation. Such silicone antifoaming agents should not be employed, however, when a foamable spray composition is employed. The amount of the antifoaming agent may vary, depending on the spraying conditions.

When cured compositions of enhanced strength are desired, it is often desirable to add to the A and B sides of the modified polyisocyanurate composition or to spray separately with or into the reaction mixture a minor amount of a strengthening-type agent, such as fibrous or particulate material. Typically, such material may constitute up to a minor amount and typically up to about 25% by weight of the resulting cured composition. Typical materials which may be employed would include a wide variety of fibers, and more particularly glass fibers, such as glass fibers which may be chopped into short fibers by a chopper above the exit nozzle of the sprayer equipment, so that the chopped glass falls in the reaction mixture exiting from the nozzle tip of the sprayer. Also, particulate material may be employed, as well as other additive materials, such as pigments, dyes, diatomaceous earth, carbon particles, carbon fibers, synthetic fibers, catalysts, flame retardants, antioxidants and the like.

Where it is desired to form a rigid foam composition, the modified polyisocyanurate composition should include a blowing amount of a blowing agent, and typically a liquid blowing agent, which, on heating, expands to form a foam composition, such as a halocarbon like a fluorocarbon or fluorochlorocarbon, and more particularly those blowing agents known as Freon (a trademark of E. I. du Pont de Nemours Co.). The amount of the blowing agent may vary, depending on the density of the resulting foam desired. Where a blowing agent is employed, it is also desirable to employ a small amount of a cell-control agent, typically a silicone material, such as a silicone glycol polymer, to promote the formation of uniform and fine-cell structure. The polyisocyanurate composition may be sprayed or poured to produce foam or solid coatings on a variety of substrates. The composition adheres well to a variety of substrates, such as metal, foil like aluminum, wood and steel, and has good fire properties.

In preparation, the components of the composition may be mixed directly at room temperature or a higher temperature, to provide an exothermic curing reaction, and, if desired, the surface of the substrate may be preheated prior to application, to enhance curing, particularly useful as a top-surface coating or rigid foam; for example, it may be sprayed on one-to-one fixed-spray equipment or variable spray equipment if desired, such as sprayed directly on asbestos-type coatings and sealings, to seal the asbestos-containing substrate.

The invention will be described for the purpose of illustration only in connection with certain embodiments; however, it is recognized that various changes, modifications, and improvements may be made by those persons skilled in the art, all falling within the spirit and scope of the invention.

DESCRIPTION OF THE EMBODIMENTS

Example 1

A modified, sprayable, polyisocyanurate composition, for spraying a solid coating of the composition onto a substrate in fixed-volume, one-to-one spray equipment, was prepared as follows:

A side
100 parts of Rubicon #168 (MDI from Rubicon Chemical Co. of 4,4'-diphenyl diisocyanate methane, functionality 2.0, specific gravity about 1.2)

B side
60 parts of methyl glucoside (Poly-G-79-375 from Olin Chemicals, pH 5–7, hydroxyl No. 375).
40 parts methoxy polyethylene glycol (MPEG from Union Carbide Corp., hydroxyl number about 100, molecular weight 550)
1 part antifoamer and degassing silicone (#5304 from Union Carbide Corp.)
0.8 parts trimerization catalyst of potassium octoate
0.4 parts buffer and cream-time increase catalyst of zinc octoate
1.5 parts cross-linking catalyst-triethanol diamine (Polycat #8 of Abbott Laboratories)
0.1 part tetravalent tin catalyst (UL 22 from Witco Chemical Co.)
(total specific gravity of B side about 1.2)

The A and B sides were admixed and sprayed to form a solid, cured coating on a T3H Glass Kraft Co. spray machine at a fixed one-to-one ratio of A and B.

Spray machine conditions were: primary heat 140° F., hose heat 120° F., and pressure 150 psi. The reaction time to cream was 3 seconds and the sprayed coating was tack-free in 10 seconds and cured in 60 seconds. The sprayed, cured coating provided a high-strength coating with good gloss. On burning, the cured coating gave a strong char, no melt and low smoke. The composition of Example 1 was sprayed as a solid surface coating onto a rigid polyisocyanurate foam substrate.

EXAMPLE 2

Example 1 was repeated, except that the trimerization catalyst was omitted from the B-side formulation. The results were the same as Example 1, except that the cured coating, on burning, melted and did not form a strong char and exhibited unsatisfactory fire performance. The absence of the trimerization catalyst provided a coating with urethane-type linkages, instead of a trimerization cross-linking.

Example 3

Example 1 was repeated, except on the B side 75 parts of methyl glucoside were employed with 25 parts of MPEG. Due to the higher amount of the slow-reacting, sterically hindered methyl glucoside, the reaction was much slower, such as about 10 seconds to cream time, while the coating properties were similar. Due to the slower reaction time, this composition would not be useful in the spray-coating of vertical or overhead surfaces, but provides a satisfactory spray composition for other purposes.

Example 4

Example 1 was repeated, except on the B side 50 parts of methyl glucoside were employed with 50 parts of MPEG. The reaction was very fast, with a reaction cream time of about 1 second, and the cured coating did not exhibit a high degree of stiffness.

Example 5

Example 1 was repeated employing up to about 17% by weight of a chopped milled glass fiber in the composition, to provide a cured coating with reinforcing glass fibers therein.

Example 6

Examples 1, 2, and 3 were repeated employing Freon 11 and Freon 113 (trademarks of DuPont Co. for trichlorofluoromethane and trichlorotrifluoroethane), to produce a rigid, sprayed, cured foam. The Freon 113, having a higher boiling point (BP 119° F.), is preferred for spray operations, since the hose temperature can run higher without premature blowing in the hose.

A typical composition of A and B side mixtures for use in 1:1 fixed volume spray equipment would comprise:

|   | Parts by weight |
|---|---|
| A side |   |
| 1. MDI functionally less than 2.4 | 100 |
| B side |   |
| 2. Polyol-alkoxy polyalkylene glycol | 25–50 |
| 3. Polyol methyl glucoside | 25–75 |
| 4. Antifoamer agent for use with solid coatings (silicone) | 0.1–3 |
| 5. Trimerization catalyst, e.g. potassium salt | 0.2–5 |
| 6. Buffering agent to increase cream time of trimerization catalyst | 0.1–1.5 |
| 7. Cross linking catalyst, e.g. zinc salt, standard urethane catalyst or combination, e.g. tetravalent tin salt and alkanol polyamine | 0.2–3 |
| 8. Blowing agent for use in preparing sprayed foam coating, such as fluorocarbon, e.g. Freon 11 or Freon 113 | 1–20 |
| 9. Cell controlled agent, e.g. glycol silicone copolymer (only for use in foam composition) | 0.1–3 |
| 10. Composition strengthening material, e.g. glass fiber | 0–20 |

The blowing agent and if desired, part of the polyol or a prepolymer maybe included in the A side along with other components to provide an equal fixed volume system. The fiber is preferably chopped or directed into the sprayed composition to admix therewith at the exit nozzles of the spray equipment. The amounts and suggested components of the typical composition for the purposes of illustration only and changes and substitutions can be made.

As illustrated, the methyl glucoside polyol can be mixed readily with excellent solubility with the MPEG, the MDI, the blowing agent and the catalyst system used. In combination with MPEG-type polyols, the methyl glucoside polyols provide sprayable, solid and foam modified polyisocyanurate compositions of high strength and good fire properties.

What is claimed is:

1. A modified, sprayable polyisocyanurate composition which is prepared by the reaction of 100 parts by weight of MDI, having an average functionality of less than about 2.4, with a polyol composition comprising from about 25 to 50 parts by weight of a $C_1$–$C_3$ alkoxypoly $C_2$–$C_3$ alkylene glycol, and from about 25 to 75 parts by weight of a methyl glucoside polyol, the reaction carried out in the presence of a trimerization catalyst.

2. The composition of claim 1 wherein the $C_1$–$C_3$ alkoxypoly $C_2$–$C_3$ alkylene glycol comprises a methoxy polyethylene glycol or a methoxy propylene glycol.

3. The composition of claim 1 wherein the $C_1$–$3$ alkoxypoly $C_2$–$C_3$ alkylene glycol comprises a methoxy polyethylene glycol, and wherein the methoxy polyethylene glycol has an average molecular weight of less than about 600 and a hydroxyl number of about 100 or less.

4. The composition of claim 1 wherein the MDI has an average functionality of from about 1.7 to 2.0.

5. The composition of claim 1 wherein the $C_1$–$C_3$ alkoxypoly $C_2$–$C_3$ alkylene glycol comprises from about 40 to 50 parts by weight and the methyl glucoside polyol comprises from about 50 to 60 parts by weight.

6. The composition of claim 1 wherein the trimerization catalyst comprises a fatty-acid metal-salt catalyst.

7. The composition of claim 6 wherein the trimerization catalyst comprises a potassium fatty-acid salt catalyst.

8. The composition of claim 1 wherein the composition includes a small degassing amount of an antifoaming silicone material.

9. The composition of claim 1 which includes a zinc fatty-acid catalyst, to buffer the trimerization catalyst.

10. The composition of claim 1 wherein the reaction has a cream time of about 5 seconds or less.

11. The composition of claim 1, which composition includes therein a minor amount of particulate or fibrous material, to increase the strength of the polyisocyanurate composition after reaction.

12. The composition of claim 11 which includes up to about 20% by weight of chopped glass fibers.

13. The composition of claim 1 which includes a small, effective, cross-linking amount of a tetravalent tin catalyst and an amine catalyst.

14. The composition of claim 13 wherein the amine catalyst comprises a triethanol diamino catalyst.

15. The composition of claim 1 wherein the methyl glucoside polyol has a hydroxyl number of less than about 400, and wherein the polyol composition has a hydroxyl number of less than about 300.

16. The composition of claim 1 which includes a blowing amount of a blowing agent, to prepare a modified polyisocyanurate foam composition.

17. The composition of claim 1 prepared by the reaction of a substantially equal-volume amount of the MDI as an A-side mixture and the polyol composition and the trimerization catalyst as the B-side mixture.

18. A substrate which includes a coating layer of the modified polyisocyanurate composition of claim 1 coated thereon.

19. A sprayable, modified polyisocyanurate composition, which composition is prepared by the reaction of an equal-volume amount of an A-side and a B-side mixture, the A-side mixture comprising about 100 parts by weight of an MDI, having an average functionality of less than about 2.4, and the B-side mixture comprising a polyol composition comprising from about 25 to 50 parts by weight of a methoxy polyethoxy glycol, and from about 25 to 75 parts by weight of a methyl glucoside polyol having a hydroxyl number of less than about 400, a potassium salt trimerization catalyst, a zinc salt to control the cream time and a tetravalent tin catalyst and a polyamine catalyst, to promote cross-linking.

20. The composition of claim 19, which composition includes a blowing amount of a halocarbon blowing agent on the B side, to provide for a sprayable, foamable, modified polyisocyanurate composition.

21. The composition of claim 19 wherein the reaction has a cream time of about 3 seconds or less, with substantial cure of the reaction composition occurring in about 60 seconds or less.

22. The composition of claim 21 which includes up to 20% by weight of chopped glass fibers.

23. The composition of claim 19, which composition includes a small, antifoaming amount of a degassing silicone material.

24. A substrate which includes a coating layer of the modified polyisocyanurate composition of claim 19 coated thereon.

25. A substrate which comprises a rigid-foam material and which includes a coating thereon of the modified polyisocyanurate composition of claim 19.

26. A modified, sprayable polyisocyanurate composition which is prepared by the spray reaction of substantially equal volumes of an A-side and B-side mixtures in fixed-volume spray equipment:
(i) wherein the A-side mixture comprises 100 parts by weight of MDI having an average functionality of less than about 2.4; and
(ii) wherein the B-side mixture comprises:
25 to 50 parts by weight of methoxy polyethoxy glycol;
25 to 75 parts by weight of a methyl glucoside;
the methyl glucoside and the methoxy polyethylene glycol having a combined hydroxyl number of less than about 325;
0.2 to 5 parts by weight of a trimerization catalyst;
about 0.1 to 1.5 parts by weight of a buffering agent to increase the cream time of the trimerization catalyst;
about 0.2 to 3 parts by weight of a cross-linking catalyst; and
0 to 20 parts by weight of a composition strengthening material.

27. The composition of claim 26 which includes:
about 1 to 20 parts by weight of a blowing agent to prepare a sprayed foam coating; and
about 0.1 to 3 parts by weight of a cell control agent.

* * * * *